United States Patent
Pandya et al.

(10) Patent No.: US 8,030,888 B2
(45) Date of Patent: Oct. 4, 2011

(54) WIRELESS CHARGING SYSTEM FOR VEHICLES

(76) Inventors: Ravi A. Pandya, El Dorado Hills, CA (US); Ashish A. Pandya, El Dorado Hills, CA (US)

( * ) Notice: Subject to any disclaimer, the term of this patent is extended or adjusted under 35 U.S.C. 154(b) by 502 days.

(21) Appl. No.: 12/190,439

(22) Filed: Aug. 12, 2008

(65) Prior Publication Data

US 2009/0045773 A1   Feb. 19, 2009

Related U.S. Application Data

(60) Provisional application No. 60/964,639, filed on Aug. 13, 2007.

(51) Int. Cl.
*H02J 7/00* (2006.01)
(52) U.S. Cl. .......................... 320/109; 320/108
(58) Field of Classification Search ............. 320/108, 320/109
See application file for complete search history.

(56) References Cited

U.S. PATENT DOCUMENTS

| | | | | |
|---|---|---|---|---|
| 5,578,875 A | * | 11/1996 | Dormer et al. | 307/66 |
| 6,816,087 B2 | * | 11/2004 | Lane | 340/945 |
| 2004/0023678 A1 | * | 2/2004 | Fredriksson | 455/502 |
| 2008/0001572 A9 | * | 1/2008 | Baarman et al. | 320/108 |

* cited by examiner

*Primary Examiner* — M'Baye Diao
(74) *Attorney, Agent, or Firm* — DLA Piper LLP US

(57) ABSTRACT

A system of energy storage and charging usable in vehicles and other applications that eliminate the battery capacity and automotive range issues is described. In our invention, vehicles are equipped with charging mechanisms to charge and recharge onboard batteries using wireless electricity and power transmission using magnetic resonant coupling between tuned electromagnetic circuits. The batteries may be charged using wireless charging systems installed along the roads while the vehicle is in use on the road. Charging system may optionally utilize infrared laser beam radiation to transmit power for charging the batteries on board a vehicle while it is in use as well. The onboard vehicle batteries may also be charged when the vehicle is not being driven either by plugging in the vehicle into wall electricity using wired power connection or may be wirelessly charged using the magnetic resonant coupling. By locating the charging circuits on roads, a continuous operation of electric-only mode of hybrid vehicles or pure electric-only vehicles can be accomplished and fully eliminate the need for gasoline usage.

5 Claims, 6 Drawing Sheets

Magnetic resonant coupled wireless charging system embedded on a road

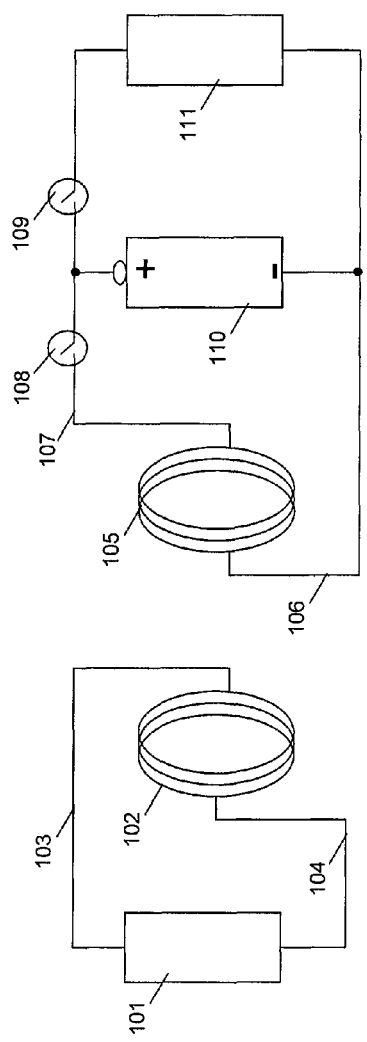
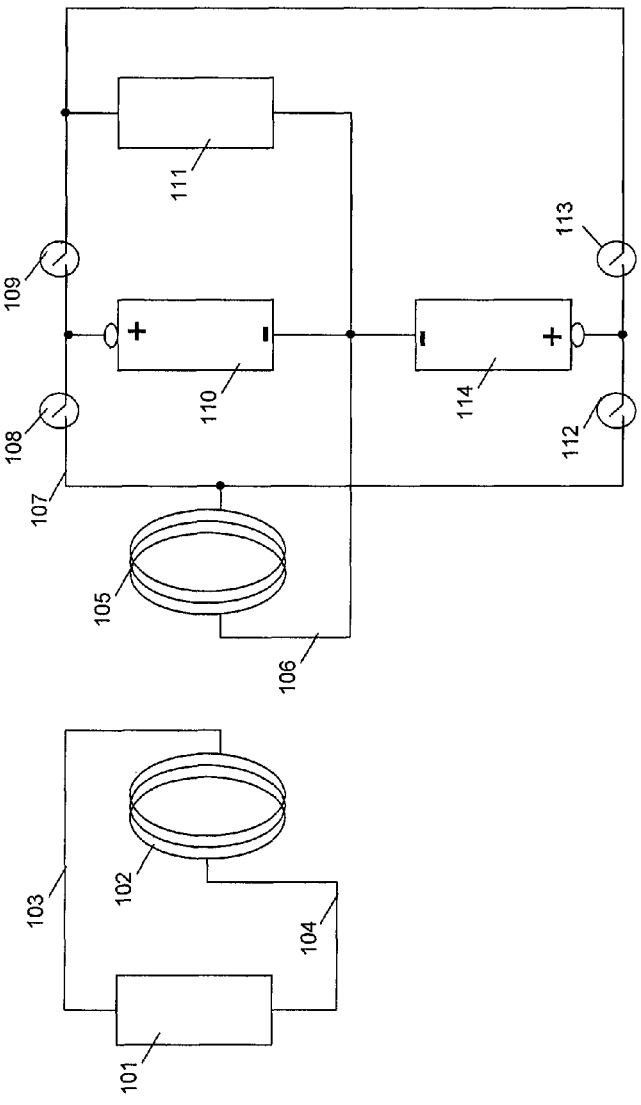
Fig. 1A Magnetic resonant coupled wireless charger for vehicle battery
Fig. 1B Magnetic resonant coupled wireless charger for dual mode vehicle batteries

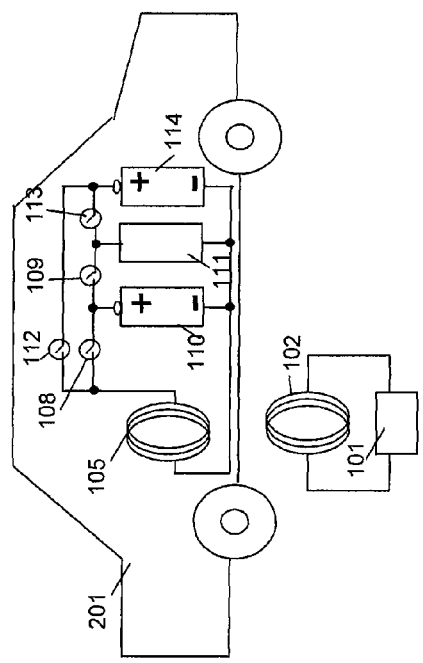
Fig. 2A Magnetic resonant coupled wireless charger for vehicles
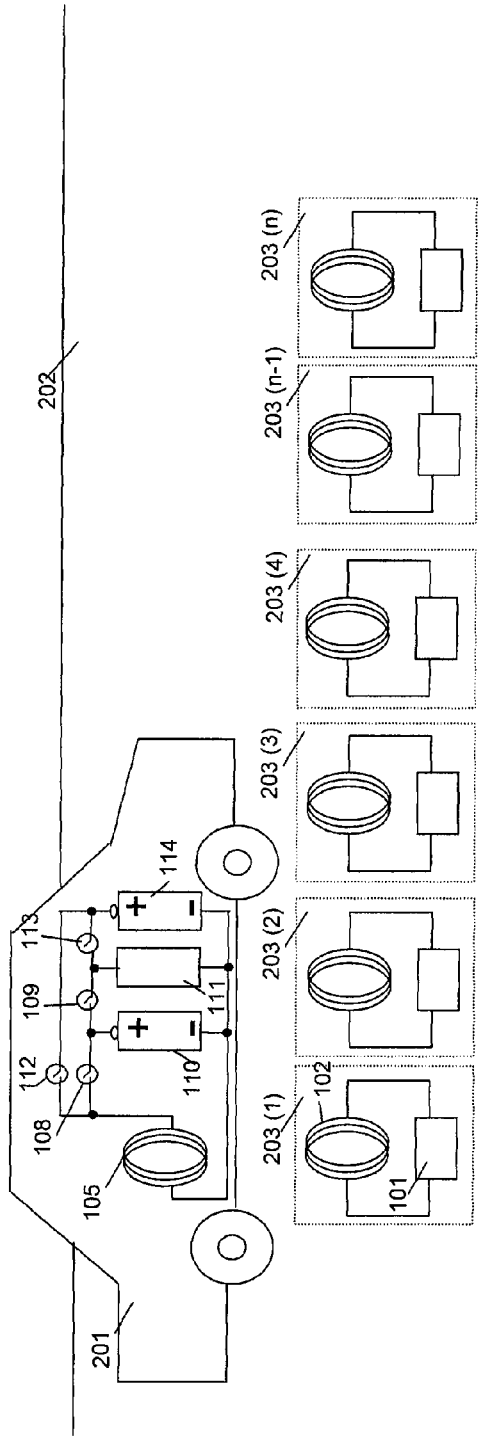
Fig. 2B Magnetic resonant coupled wireless charging system embedded on a road

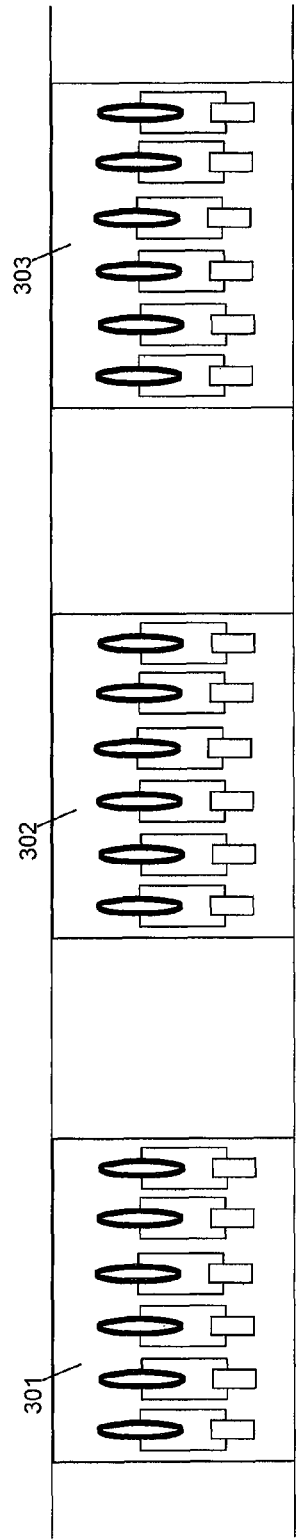
Fig. 3A Wireless Chargers on a road built in segments
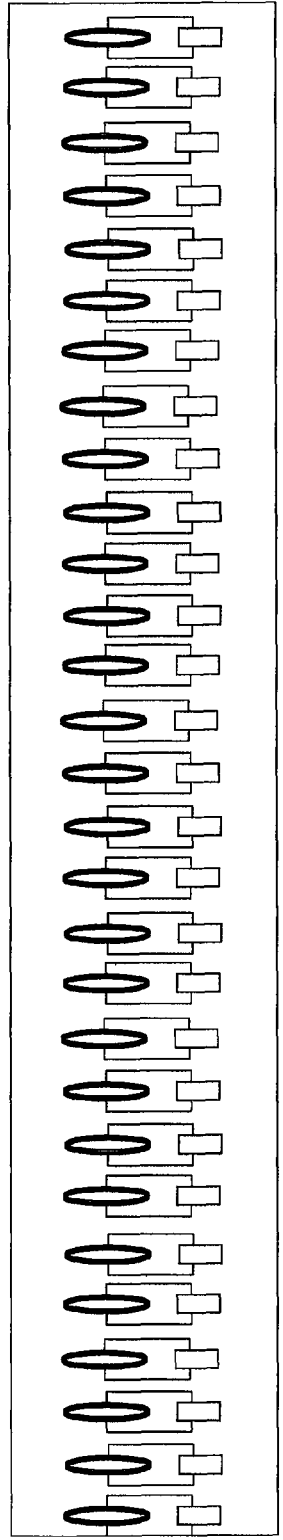
Fig. 3B Continuous Wireless Chargers on a road
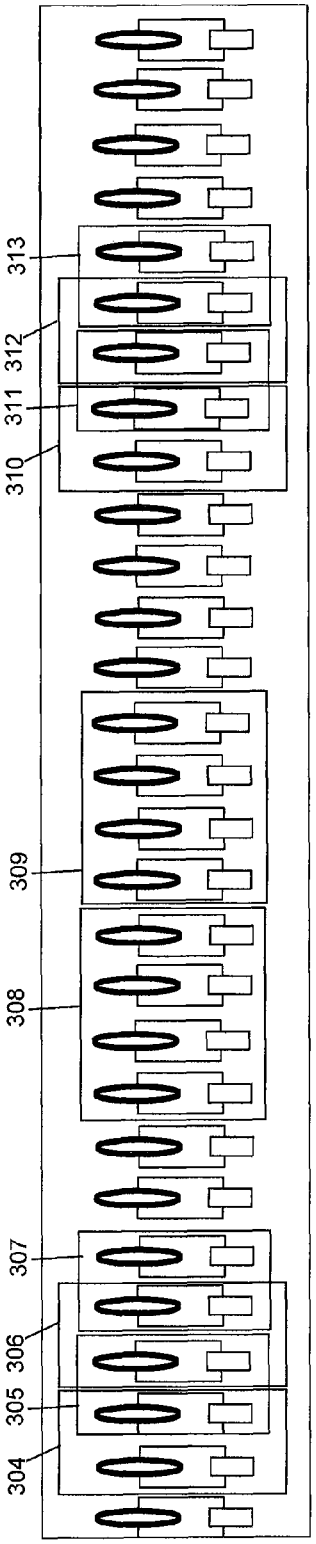
Fig. 3C Segments of Wireless Chargers on a road activated using sensors

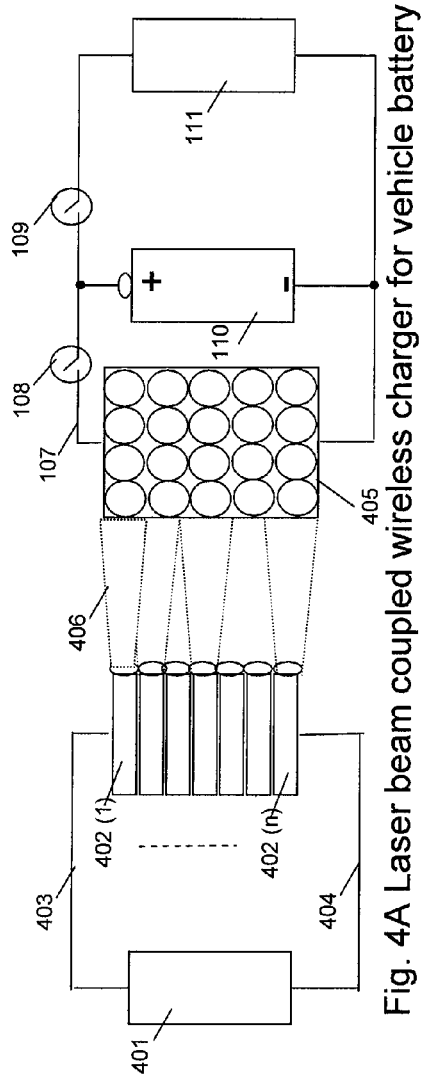
Fig. 4A Laser beam coupled wireless charger for vehicle battery
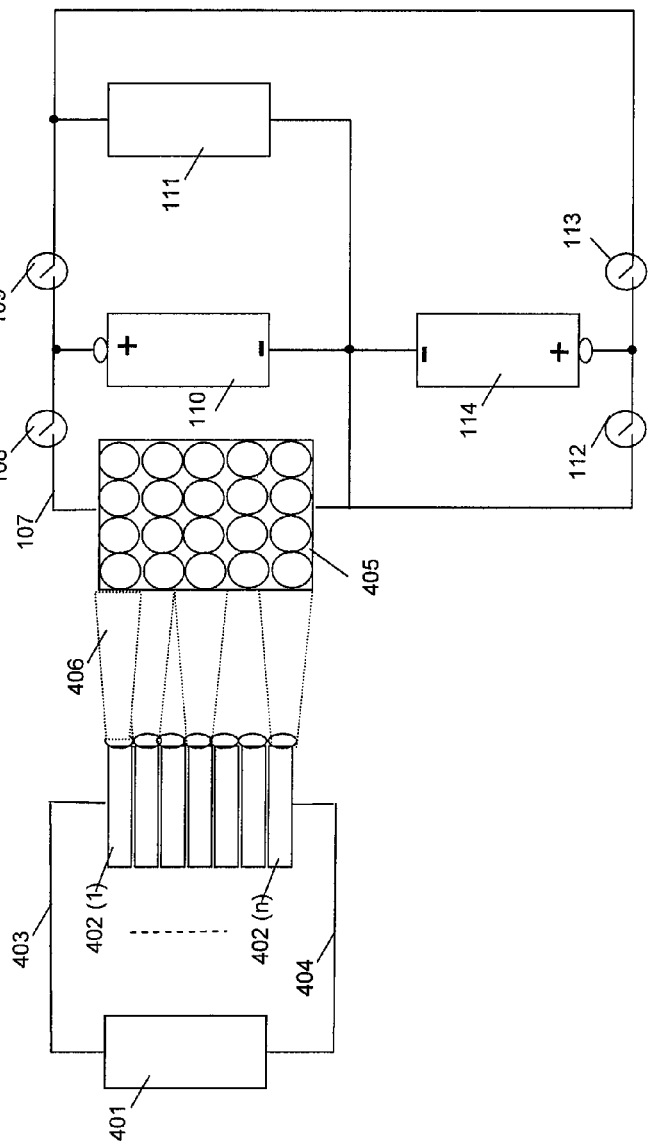
Fig. 4B Laser beam coupled wireless charger for dual mode vehicle batteries

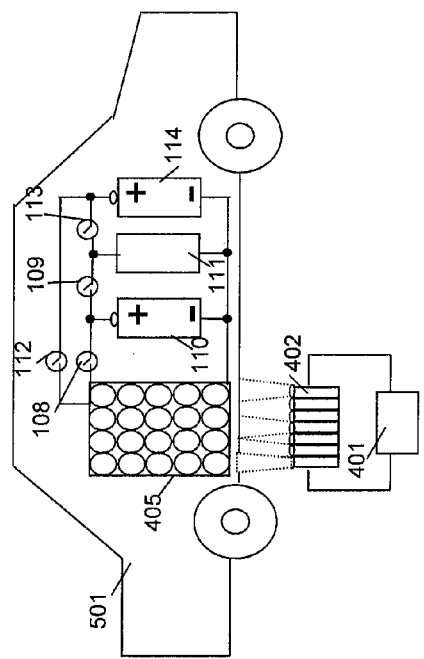
Fig. 5A Laser beam coupled Wireless charger for vehicles
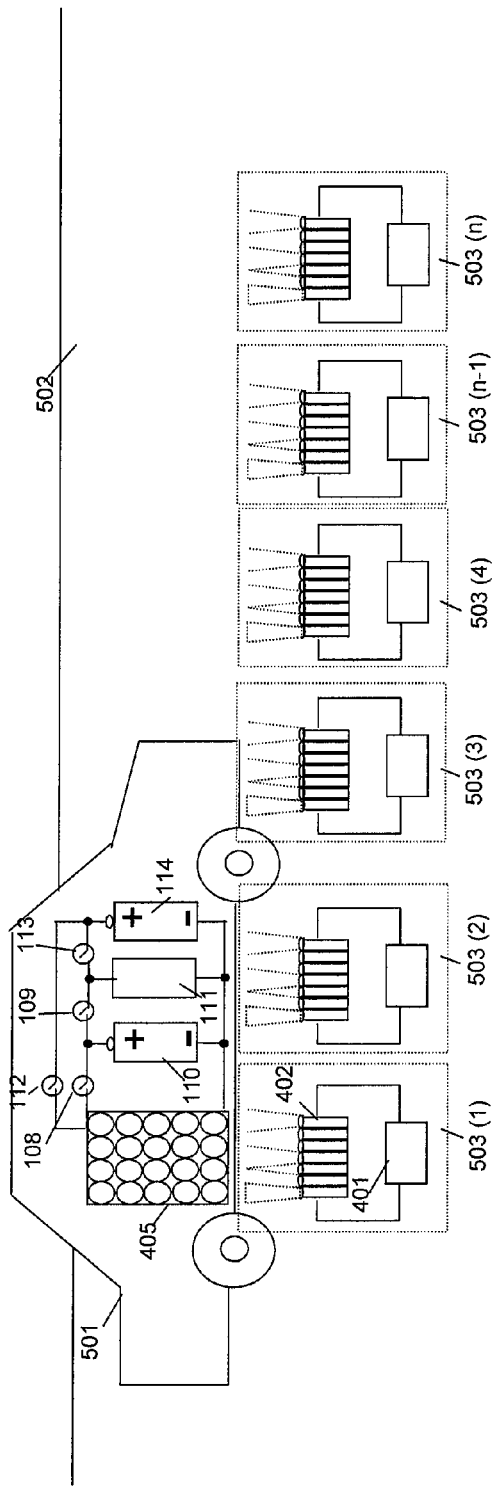
Fig. 5B Laser beam coupled Wireless charger for vehicles embedded on a road

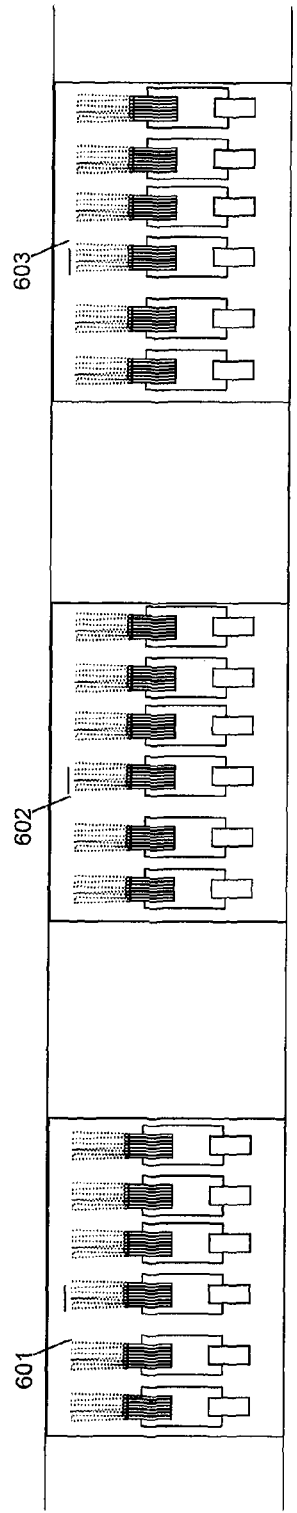
Fig. 6A Laser Wireless Chargers on the road built in segments
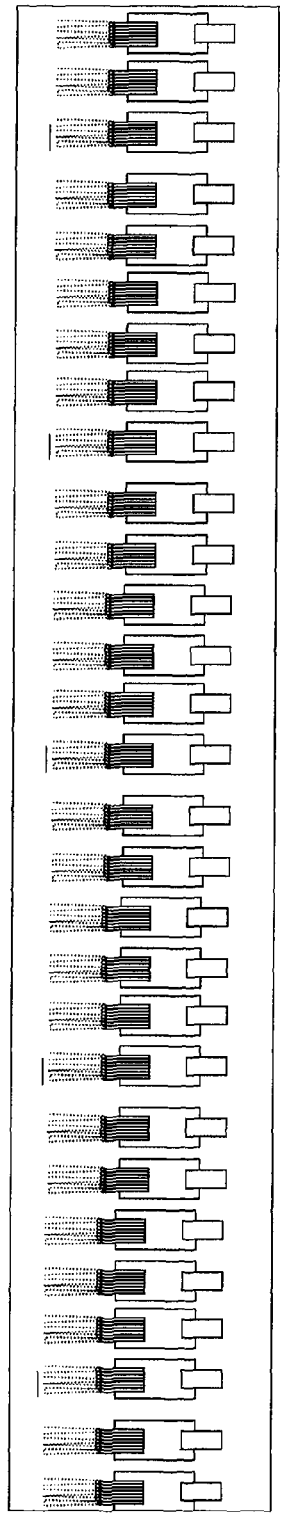
Fig. 6B Continuous laser wireless chargers on a road
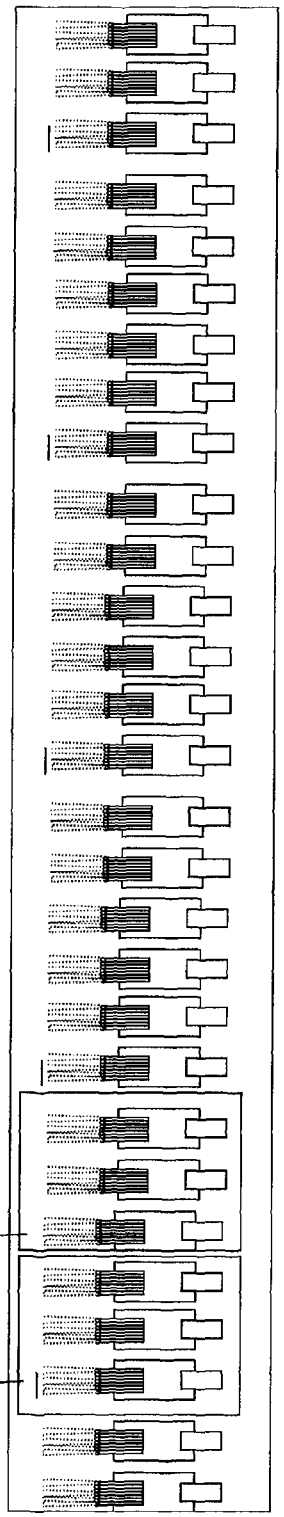
Fig. 6C Segments of Laser Wireless Chargers on a road activated using sensors

WIRELESS CHARGING SYSTEM FOR VEHICLES

RELATED APPLICATIONS

Priority is claimed to Provisional Application Ser. No. 60/964,639, filed on Aug. 13, 2007, which is incorporated herein fully by reference.

BACKGROUND OF THE INVENTION

This invention relates generally to alternative energy technologies and in particular to rechargeable batteries for vehicles.

A significant amount of research and development resources are being devoted towards alternative energy technologies. Global warming issues driven from the carbon released in the atmosphere from burning of fossil fuels and other green house gases has led to a significant worldwide interest from scientists and researchers to address the issues. Alternative energy technologies like wind, solar, electrochemical, magnetic, geothermal, biomass, nuclear and the like are being pursued aggressively for large scale commercialization to mitigate the impact of fossil fuel based energy resources on climate change as well as over cost of such fuels.

Electrochemical batteries and fuel cells have been considered as most promising energy research area by their supporters. These small and non-polluting devices that produce energy without combustion could help many residential power needs, but their most exciting application is in transportation. These devices are used in the automotive market in hybrid vehicles that have seen a 20 fold increase in their sales from 10,000 units in 2000 to over 200,000 cars in 2005. The key driving force behind the development and the sale of hybrid vehicles is the improvement in fuel efficiency and economy. Hybrid vehicles comprise of both an internal combustion engine and an electric motor which run on gasoline and battery power respectively. Today's commercially available hybrid vehicles use small batteries or fuel cells which can store 1-2 kilowatt-hours of energy. The electric battery power is primarily used for shorter distances with stop and go traffic where the gasoline fuel economy is very low. However, if the battery capacity of the hybrid vehicles is increased to include 6-8 kilowatt-hours of energy storage, the vehicle could operate in an electric-only mode for up to 50 miles. However, development of battery technology for use of such vehicles in electric-only mode for distances larger than 50 miles is considered extremely difficult by leading scientists. This would practically prevent creation of pure electric-only vehicles that give comparable driving range as presently available gasoline vehicles without recharging or refueling.

Today's hybrid vehicles utilize Nickel Metal Hydride (Ni-MH) batteries, however Lithium-ion (Li-ion) batteries can be used to double the energy efficiency and power over Ni-MH batteries. However for pure electric only vehicles at least a doubling of battery capacity over Li-ion batteries is required which is considered a nontrivial undertaking by leading research organizations.

Our inventions show a system of energy storage and charging usable in vehicles and other applications that eliminate the battery capacity and automotive range issues discussed above.

SUMMARY OF THE INVENTION

This invention relates generally to alternative energy technologies and in particular to rechargeable batteries for vehicles.

Today's hybrid vehicles utilize Ni-MH batteries with a capacity in the range of 1-2 Kilowatt-hours that allow it to operate for 10 to 20 miles without using any gasoline. This range can be increased to 40 to 50 miles of electric-only operation by increasing battery capacity to 6-8 kilowatt-hours as is achievable using Li-Ion battery technology. Such driving distance is sufficient for many local driving usage patterns where the battery may get recharged each night before local driving and thus may avoid using gasoline for the hybrid vehicle. However, whenever the driving distance is more than the range of 40 to 50 miles, gasoline has to be used. Thus green-house gases would still be generated in large portions and would continue to create transportation driven global warming issues.

We show a system of energy storage and charging usable in vehicles and other applications that eliminate the battery capacity and automotive range issues. In our invention, vehicles are equipped with charging mechanisms to charge and recharge onboard batteries while the vehicle is being driven on the road using wireless electricity and power transmission using magnetic resonant coupling between tuned electromagnetic circuits. The charging system may optionally utilize infrared laser beam radiation to transmit power for charging the batteries on board a vehicle while it is in use.

By locating the charging circuits at appropriate places as illustrated and described below, a continuous operation of electric-only mode of hybrid vehicles or pure electric-only vehicles can be accomplished and completely eliminate the need for gasoline usage. Thus our invention can truly solve the global warming and green house gases issue created from transportation methods that use fossil fuels.

BRIEF DESCRIPTION OF THE DRAWINGS

FIG. 1A illustrates magnetic resonant coupled wireless charger for vehicle battery.

FIG. 1B illustrates magnetic resonant coupled wireless charger for dual mode vehicle batteries.

FIG. 2A illustrates magnetic resonant coupled wireless charger for vehicles.

FIG. 2B illustrates magnetic resonant coupled wireless charging system embedded on a road.

FIG. 3A illustrates Wireless chargers on a road built in segments

FIG. 3B illustrates Continuous Wireless Chargers on a road

FIG. 3C illustrates Segments of Wireless chargers on a road activated using sensors FIG. 4A illustrates Laser beam coupled wireless charger for vehicle battery FIG. 4B illustrates Laser beam coupled wireless charger for dual mode vehicle batteries FIG. 5A illustrates Laser beam coupled Wireless charger for vehicles FIG. 5B illustrates Laser beam coupled Wireless charger for vehicles embedded on a road FIG. 6A illustrates Laser Wireless Chargers on the road built in segments FIG. 6B illustrates Continuous laser wireless chargers on a road FIG. 6C illustrates Segments of Laser Wireless Chargers on a road activated using sensors

DESCRIPTION

This invention relates generally to alternative energy technologies and in particular to rechargeable batteries for vehicles.

We show a system of energy storage and charging usable in vehicles and other applications that eliminate the battery capacity and automotive range issues. In our invention, vehicles are equipped with charging mechanisms to charge and recharge onboard batteries using wireless electricity and power transmission using magnetic resonant coupling between tuned electromagnetic circuits while the vehicle is being driven on the road. The charging system may optionally utilize infrared laser beam radiation to transmit power for charging the batteries on board a vehicle while it is in use as described below. The onboard vehicle batteries may also be charged when the vehicle is not being driven either by plugging in the vehicle into wall electricity using wired power connection or may be wirelessly charged using the magnetic resonant coupling.

By locating the charging circuits at on roads as illustrated and described below, a continuous operation of electric-only mode of hybrid vehicles or pure electric-only vehicles can be accomplished and fully eliminate the need for gasoline usage. Thus our invention can truly solve the global warming and green house issue created by transportation methods that use fossil fuels.

PREFERRED EMBODIMENTS AND DETAILED DESCRIPTION

Today's hybrid vehicles deploy 1-2 kilowatt-hour rechargeable batteries which give them an electric only mode operation for 10 to 20 miles. This range can be extended to 40 to 50 miles using 6 to 8 Kilowatt-hour batteries using Li-Ion batteries. The batteries cannot be used until they are recharged once they are used for their target range. Such range of operation in electric only mode can be useful for local travel, however for longer distance travel gasoline has to be used which continues to add green house gases in the atmosphere.

To extend the battery capacity to store more energy is a difficult problem to solve and may even require new battery technology and materials to be invented. Our invention does not require invention of any new battery technology. Our invention works with existing rechargeable battery technologies like NiMH, Li-Ion and the like or fuel cells.

The rechargeable batteries of the hybrid vehicles today may be charged by the owners at home or at work or at charging stations or the like by plugging in the batteries for charging to wired chargers at such locations extracting electricity from wall electric plugs and the like. During the period of charging a hybrid vehicle is not usable. These limitations prevent development of electric only vehicles that provide the same range as hybrid or gasoline only vehicles.

In our invention vehicles may be equipped with wireless battery charging systems to charge the rechargeable batteries onboard the vehicle. In our invention wireless battery charging systems are optionally laid out or built or embedded on the road surface or may be overhead on the roads or on the sides of the roads or the like. The road surface mounted wireless charging systems may be built on roads that may be specifically built to allow vehicles to drive over them. Similarly chargers may be mounted overhead on the roads where vehicles may be driven under them. When a vehicle equipped with a wireless battery charging system passes over or under or by the wireless charger systems on roads specifically built with such systems the onboard battery of the vehicle may be charged as described below. In this patent roads equipped with charging systems are also referred to as charging roads.

FIG. 1A illustrates magnetic resonant coupled wireless charger for vehicle battery. Transmitting power using wireless methods has been known for a long time. However, recently researchers at MIT demonstrated a wireless power transfer using strongly coupled magnetic resonant coils that use non-radiating megahertz frequency magnetic field using self-resonant copper magnetic coils to light a 60 Watt light bulb. This principle of wireless power transfer is used in this invention to wirelessly charge a vehicle battery. The power transmitter coil or device, 102, is strongly tuned and coupled magnetically to the power receiving coil or device, 105, using magnetic resonance to transfer power even when there is no physical connection between the two devices, 102 and 105. These coils or devices can be separated from each other for up to several meters and still achieve a large portion of transmitter power to be received. Further, unlike an inductive coupling mechanism that is used in traditional power supplies where a close proximity between coils is required to achieve a high power transfer efficiency, the strong magnetic resonance coupling can be used to achieve a high power transfer efficiency even when the distance between the transmitting and receiving devices are several meters. Such a method of power transfer can achieve orders of magnitude higher efficiency of power transfer at these distances compared to inductive coupling or radiated electromagnetic energy used in wireless communication devices. Further, resonant magnetically coupled non-radiating magnetic field does not interact strongly with objects that are not resonant to its frequency and are also not harmful to biological systems and hence do not pose a significant health hazard for people.

The transmitter coil, 102, is powered by a power supply, 101, which may draw its power from a power station or power source which may be generating its power using technologies like solar power, nuclear power, geothermal power, coal or wind or the like. The power supply generates current through the wires, 103 & 104, coupled to the transmitter coil, 102, to generate a non-radiating resonant magnetic field around the coil. The receiving coil, 105, is resonant to this magnetic field and receives the transmitted power when it is within a distance of a few meters of the transmitter coil, 102, without physical contact with the transmitter coil. The receiving coil is coupled to a rechargeable battery and its circuits, 110, through a switch 108, and the connecting wires, 107 and 106. When the switch, 108, is closed or turned-on, the circuit connectivity between the receiving coil and the battery circuit, 110, is established and a current flow is established which starts charging the battery. Once the battery, 110, is charged, the switch, 108, is turned-off to prevent the battery from overcharging. The figure does not illustrate all the control circuits that perform the functions of turning various switches and sensors in this invention on and off, so as to not obscure the invention. Design and implementation of controlling a switch to perform the on and off functions are well understood as may be obvious to one with ordinary skill in the art. Once the battery is charged the switch, 109, is closed or turned-on which establishes a circuit connection between the battery and a load, 111, which can then draw power from the battery to do its operation. In one embodiment of this invention, the load, 111, may optionally be an electric motor and its associated circuitry used to drive a vehicle. The vehicle may be a pure electric vehicle or may be a hybrid vehicle or the like. The rechargeable battery, 110, may optionally be made of NiMH or Li-Ion or Lead-acid or the like technologies. As discussed above, our invention is agnostic to the type of the rechargeable battery technology, except that appropriate battery circuits in 110 would need to be embodied to properly operate the battery.

FIG. 1B illustrates magnetic resonant coupled wireless charger for dual mode vehicle batteries. The circuits illustrated in this figure operate similar to those illustrated in FIG. 1A, however a few components are added in this illustration. A set of switches, 112 and 113, and another rechargeable battery, 114, is added in this illustration. Two rechargeable batteries in this operating mode can thus be used in dual modes, where in, when one battery is being charged the other may be used to operate the load, 111. For instance, when battery 110 is fully charged and is being used to operate the load, 111, the battery, 114, may be charged from the receiving coil 105, when the switch 112 is closed or turned-on to establish a circuit between the battery, 114, and the receiving coil, 105, through the wires, 106 and 107. During such operation, the switches 108 and 113 would be open or turned-off and the switch 109 would be closed or turned-on to establish connectivity between battery, 110, and load 111 and establish separate circuit connectivity between the coil, 105, and battery, 114. Similarly, when the battery 110, is being charged from the receiving coil, and the battery 114 is being used to operate the load 111, the switches 109 and 112 would be turned-off or be open whereas the switches 108 and 113 would be closed or turned-on. Thus the illustrated system of FIG. 1B can be used to operate a load at all times, from one or the other battery while the battery not be used to operate the load is being charged from the wireless charging elements of this illustration.

The vehicle batteries used today can hold 1-2 kilowatt-hours of energy, however Li-ion batteries can hold 6-8 kilowatt-hours of energy to enable electric only travel mode for 40 to 50 miles. In our invention, unlike the MIT demonstration of 60 W power transfer, a much higher level of power transfer may optionally be performed to charge the batteries in a short time period. The power transfer may be in the range to 6 to 8 Kilowatts or more using multiple transmit and receive coils and use parallel paths from such coils to charge the batteries in a short time period as may be appreciated by one with ordinary skill in the art.

FIG. 2A illustrates a Magnetic resonant coupled wireless charger for vehicles. The figure illustrates a vehicle, 201, with onboard rechargeable batteries, 110 and 114, along with the receive coil or device, 105 and the appropriate switches 108, 109, 112 and 113 which are described above for illustration in FIG. 1B. The wireless power transmitting components, like 101 and 102, along with their connecting circuits are left off from the vehicle. When the vehicle comes within the magnetic resonant coupling distance of the power transmit device or coil, 102, it can start receiving power to charge its battery or operate a load or the like. The transmit coil may be deployed in homes, offices, charging stations or the like where a vehicle using the onboard wireless power receiving device, 105, can draw power from the transmit coil to recharge its on board battery or batteries. When the wireless power transmitter is deployed at locations like a home or an office or a charging station or a like at fixed designated charging locations, the vehicle cannot be used while it is being charged. Under such a scenario a wireless charging device may not add a lot of value to a user of an electric vehicle or a hybrid vehicle, compared to today's wired charging solutions, except that a close contact with the charging devices may not be required if a wireless charging technology is used as described in this patent. However, the limitation of the usage of hybrid vehicle with regards to the driving range of 40 to 50 miles only in an electric only mode would continue to remain.

FIG. 2B illustrates magnetic resonant coupled wireless charging system embedded on a road. In this embodiment of our invention, one or more power transmitting devices, 102, are built or embedded on the road, 202 or the road surface or the like. In other embodiments of this invention the power transmitting devices may be above the road over the vehicles or on the side of the road as described above. Even though the figure illustrates the power supply elements, 101, of the wireless power transmitter subsystems, 203(1) through 203(n), are illustrated to be embedded in the road next to the transmitting coils, 102, it is possible and may be preferred to have the power supplies be located at a facility away from the road, like at a power station or the like and the wires, 103 and 104, connecting the power supply, 101 to the transmitting device or coil, 102, be run from such locations to the transmitting coils or devices, 102. When a vehicle, 201, equipped with a wireless receiving device and rechargeable batteries and the like comes in magnetic resonance coupling distance of the power transmitter subsystem like 203 (1), it can receive power to charge its on board rechargeable battery while it is in the coupling distance which may be a few meters. If only one such power transmitter subsystem, like 203(1) is present, when the vehicle is moving, the vehicle may stay in the coupling distance for a few seconds depending on the speed of the vehicle and would certainly not be sufficient to charge its battery. However, as illustrated in this figure, if multiple power transmitter subsystems are embedded on the road where the vehicle is traveling, the vehicle's onboard power receiving coil or device, 105, may be coupled to at least one of the wireless power transmitter subsystems thereby creating an effect of the receiving coil to be constantly coupled to a power transmitting device as if the vehicle is stationary near a wireless power transmitter. Thus using the invention of this patent, a vehicle can continue to be charged while it is in motion as long as the vehicle is in the magnetic resonance coupling distance of the wireless transmitter device. This can drastically lower or eliminate the need of vehicles to operate on fossil fuels even for longer distances comparable to the range of today's gasoline fueled vehicles, if charging roads with appropriate sections of wireless power transmitter subsystems are available.

FIG. 3A illustrates wireless chargers on a road built in segments. In this illustration the wireless power transmitter subsystems are embedded on sections of the roads which may each stretch for distances of a few miles to 30 miles or more. For example, when a vehicle 201 enters the section 301, it may be able to wirelessly start charging one or more of its on board batteries, while using one of the charged batteries to continue to drive on the charging road section 301. If section 301, stretches for say 50 miles, and the vehicle is driven at a speed of 50 miles per hour, then the onboard rechargeable batteries can be wirelessly charged for a period of one hour which may be sufficient to transfer a significant energy to the batteries to continue to drive on the road for a while before the next stretch or section, 302, of wireless charging road is reached, when the vehicle can start charging the batteries again. As described above the power transmitter subsystems would transmit significant power like for one embodiment of over 6 to 8 Kilowatt hour. Thus by using the inventions of this patent, vehicles can achieve electric-only mode of operation for long distance travel along with local travel and possibly eliminate or sharply reduce the need for gasoline.

FIG. 3B illustrates Continuous Wireless Chargers on a road. There may be special roads build with the wireless power transmitter subsystems built from one place to another place which can be used to wirelessly charge on board batteries of vehicles or even completely power such vehicles to operate using wireless power transmitted from the wireless transmitter subsystems. Such roads may be toll roads or built specifically for wireless power charging for vehicles with wireless power receivers.

FIG. 3C illustrates Segments of Wireless Chargers on a road activated using sensors. The vehicles with wireless power receiving devices onboard vehicles and the wireless power transmitter subsystems on the roads may optionally comprise of sensors or communication devices that can communicate with each other (not illustrated). Thus when a vehicle with a wireless power receiving device is in magnetic coupling distance of the wireless power transmitter subsystem the sensors or the communication devices communicate with each other such that only a small number of wireless power transmitter subsystems may need to be turned on to not waste power from power transmitter subsystems that may not be in a coupling distance of the vehicle. In one embodiment power transmitter devices within a few meters of the vehicle may be turned on in a sequence as the vehicle travels while those not in the coupling distance may be turned off there by saving power from being wasted. For example, when the vehicle comes near a section of the road like 304, the power transmitters of section 304 and optionally sections 305 or the like may be turned-on, however the transmitters in sections of road beyond 306 may be turned-off. However, as the vehicle moves forward for example to section 306, the power transmitters of sections 304 and 305 may be turned-off while the power transmitters of section 306, 307 and the like may be turned-on. The number of power transmitters turned-on around the vehicle may depend on many factors like the range of magnetic coupling, the strength of the magnetic fields, the length of the vehicle, the number of receiver devices on the vehicle and the like as may be appreciated by one with ordinary skill in the art. Further, if vehicles that do not posses the onboard wireless charging devices or may not need to charge their batteries or the like travel on the roads with wireless power transmitters, the power transmitters would not be turned on there by using their power only when necessary to charge a vehicle with wireless power receiver device and optionally only when such a vehicle needs its batteries to be charged.

FIG. 4A illustrates laser beam coupled wireless charger for vehicle battery. Solar panels are used to receive energy from the sunlight and convert it into electricity. However, this process is highly inefficient and also dependent on the weather condition for it to be effective for power generation. Though solar powered vehicles have been demonstrated they are not in widespread use for reasons outlined above as well as cost and other reasons. Solar panels have primarily been used as a way of generating power from sun light on buildings and fixed locations during periods of sunlight. The figure illustrates a receiving system that can convert energy from light (visible or invisible spectrum) to electricity using a panel of light detectors, 405, that convert the light in to electricity and are used to charge a battery system connected to it in a manner similar to that illustrated and described in FIG. 1A. In this invention one or more light or laser or infrared laser emitting power devices, 402(1) through 402(n), are used to transmit power using light or laser or infrared laser or the like preferably in invisible spectrum though it can also be in visible spectrum. The power transmitter laser devices, 402(1) through 402(n), are tuned and coupled to the power receiving panel of light detectors, 405, using light or laser or infrared laser or the like to transfer power even when there is no physical connection between the devices, 402(1) through 402(n) and 405. These devices can be separated from each other for up to several meters and still achieve a large portion of transmitter power to be received. When laser or infrared lasers are used a beam with a very tight directional control is used to transmit and receive power. Such a method of power transfer can achieve orders of magnitude higher efficiency of power transfer at these distances compared to visible light emitting devices without directional focus. Advances in current laser diode technologies is such that it is expected that within near future a 1 kilowatt per 1 cm diode laser bar will be achievable commercially doubling the current rating of 500 Watts per 1 cm diode laser. Thus a plurality of such lasers can be used to generate a significant amount of power which can be transmitted using the laser power emitting devices, 402(1) through 402(n), which can then be received by a panel of laser beam power detectors, 405, with a very high energy transfer efficiency compared to solar panels.

The power transmitter laser devices, 402(1) through 402(n), are powered by a power supply, 401, which may draw its power from a power station or power source which may be generating its power using technologies like hydroelectric power, solar power, nuclear power, geothermal power, coal or wind or the like. The power supply generates current through the wires, 403 & 404, coupled to the power transmitter laser devices, 402, to generate a focused beam of laser or light or infrared laser or the like. The receiving laser detector panel, 405, is tuned to the appropriate laser or light frequencies and receives the transmitted power when it is within a distance of a visibility of the transmitter laser devices without physical contact with the transmitter devices. The receiving laser detector panel is coupled to a rechargeable battery and its circuits, 110, through a switch 108, and the connecting wires, 107 and 106. When the switch, 108, is closed or turned-on, the circuit connectivity between the receiving detector panel and the battery circuit, 110, is established and a current flow is established which starts charging the battery. Once the battery, 110, is charged, the switch, 108, is turned-off to prevent the battery from overcharging. The figure does not illustrate all the control circuits that perform the functions of turning various switches and sensors in this invention on and off, so as to not obscure the invention. Design and implementation of controlling a switch to perform the on and off functions are well understood as may be obvious to one with ordinary skill in the art. Once the battery is charged the switch, 109, is closed or turned-on which establishes a circuit connection between the battery and a load, 111, which can then draw power from the battery to do its operation. In one embodiment of this invention, the load, 111, may optionally be an electric motor and its associated circuitry used to drive a vehicle. The vehicle may be a pure electric vehicle or may be a hybrid vehicle or the like. The rechargeable battery, 110, may optionally be made of NiMH or Li-Ion or Lead-acid or the like technologies. As discussed above, our invention is agnostic to the type of the rechargeable battery technology, except that appropriate battery circuits in 110 would need to be embodied to properly operate the battery.

FIG. 4B illustrates laser beam coupled wireless charger for dual mode vehicle batteries. The circuits illustrated in this figure operate similar to those illustrated in FIG. 1A, however a few components are added in this illustration. A set of switches, 112 and 113, and another rechargeable battery, 114, is added in this illustration. Two rechargeable batteries in this operating mode can thus be used in dual modes, where in, when one battery is being charged the other may be used to operate the load, 111. For instance, when battery 110 is fully charged and is being used to operate the load, 111, the battery, 114, may be charged from the receiving coil 105, when the switch 112 is closed or turned-on to establish a circuit between the battery, 114, and the receiving coil, 105, through the wires, 106 and 107. During such operation, the switches 108 and 113 would be open or turned-off and the switch 109 would be closed or turned-on to establish connectivity between battery, 110, and load 111 and establish separate circuit connectivity between the coil, 105, and battery, 114. Similarly, when the battery 110, is being charged from the receiving laser detector panel, and the battery 114 is being used to operate the load 111, the switches 109 and 112 would be turned-off or be open whereas the switches 108 and 113 would be closed or turned-on. Thus the illustrated system of FIG. 1B can be used to operate a load at all times, from one or the other battery while the battery not be used to operate the load is being charged from the wireless charging elements of this illustration.

The vehicle batteries used today can hold 1-2 kilowatt-hours of energy, however Li-Ion batteries can hold 6-8 kilowatt-hours of energy to enable electric only travel mode for 40 to 50 miles. The power transfer may be in the range to 6 to 8 Kilowatts or more using multiple transmitter laser devices and receive panel detectors and use parallel paths from receiving panels to charge the batteries in a short time period as may be appreciated by one with ordinary skill in the art.

FIG. 5A illustrates a laser beam coupled wireless charger for vehicles. The figure illustrates a vehicle, 501, with onboard rechargeable batteries, 110 and 114, along with the receive detector panel or device, 405 and the appropriate switches 108, 109, 112 and 113 which are described above for illustration in FIG. 1B. The laser power transmitting components, like 401 and 402, along with their connecting circuits are left off from the vehicle. When the vehicle comes within the laser beam coupling distance of the power transmit device, 402, it can start receiving power to charge its battery or operate a load or the like. The transmit device may be deployed in homes, offices, charging stations or the like where a vehicle using the onboard laser power receiving device, 405, can draw power from to recharge its on board battery or batteries.

FIG. 5B illustrates laser beam coupled wireless charging system embedded on a road. In this embodiment of our invention, one or more laser power transmitting devices, 402, are built or embedded on the road, 502 or the road surface or the like. In other embodiments of this invention the laser power transmitting devices may be above the road over the vehicles or on the side of the road as described above. Even though the figure illustrates the power supply elements, 401, of the laser power transmitter subsystems, 503(1) through 503(n), are illustrated to be embedded in the road next to the transmitting devices, 402, it is possible and may be preferred to have the power supplies be located at a facility away from the road, like at a power station or the like and the wires, 403 and 404, connecting the power supply, 401 to the transmitting device, 402, be run from such locations to the transmitting devices, 402. When a vehicle, 501, equipped with a laser receiving device and rechargeable batteries and the like comes in coupling distance of the power transmitter subsystem like 503 (1), it can receive power to charge its on board rechargeable battery while it is in the coupling distance. If only one such power transmitter subsystem, like 503(1) is present, when the vehicle is moving, the vehicle may stay in the coupling distance for a few seconds depending on the speed of the vehicle and would certainly not be sufficient to charge its battery. However, as illustrated in this figure, if multiple power transmitter subsystems are embedded on the road where the vehicle is traveling, the vehicle's onboard power receiving device, 405, may be coupled to at least one of the laser power transmitter subsystems thereby creating an effect of the receiving panel to be constantly coupled to a power transmitting device as if the vehicle is stationary near a laser power transmitter. Thus using the invention of this patent, a vehicle can continue to be charged while it is in motion as long as the vehicle is in the laser coupling distance of the laser transmitter device. This can drastically lower or eliminate the need of vehicles to operate on fossil fuels even for longer distances comparable to the range of today's gasoline fueled vehicles, provided charging roads with appropriate sections of laser power transmitter subsystems are available.

FIG. 6A illustrates laser wireless chargers on a road built in segments. In this illustration the laser power transmitter subsystems are embedded on sections of the roads which may each stretch for distances of a few miles to 30 miles or more. For example, when a vehicle 501 enters the section 601, it may be able to start charging one or more of it's on board batteries, while using one of the charged batteries to continue to drive on the charging road section 601. If section 601, stretches for say 50 miles, and the vehicle is driven at a speed of 50 miles per hour, then the onboard rechargeable batteries can be charged for a period of one hour which may be sufficient to transfer a significant amount energy to the batteries to continue to drive on the road for a while before the next stretch or section, 602, of charging road is reached, when the vehicle can start charging the batteries again. As described above the power transmitter subsystems would transmit significant power like for one embodiment of over 6 to 8 Kilowatt hour. Thus by using the inventions of this patent, vehicles can achieve electric-only mode of operation for long distance travel along with local travel and possibly eliminate or sharply reduce the need for gasoline.

FIG. 6B illustrates Continuous laser Wireless Chargers on a road. There may be special roads build with the laser power transmitter subsystems built from one place to another place which can be used to charge on board batteries of vehicles or even completely power such vehicles to operate using wireless power transmitted from the laser transmitter subsystems. Such roads may be toll roads or built specifically for wireless power charging for vehicles with wireless power receivers.

FIG. 6C illustrates Segments of laser Wireless Chargers on a road activated using sensors. The vehicles with wireless laser power receiving devices onboard vehicles and the wireless laser power transmitter subsystems on the roads may optionally comprise of sensors or communication devices that can communicate with each other (not illustrated). Thus when a vehicle with a wireless power receiving device is in laser coupling distance of the wireless laser power transmitter subsystem the sensors or the communication devices communicate with each other such that only a small number of wireless laser power transmitter subsystems may need to be turned on to not waste power from power transmitter subsystems that may not be in a coupling distance of the vehicle. In one embodiment power transmitter devices within a few meters of the vehicle may be turned on in a sequence as the vehicle travels while those not in the coupling distance may be turned off there by saving power from being wasted. For example, when the vehicle comes near a section of the road like 604, the power transmitters of section 604 and optionally sections 605 or the like may be turned-on, however the transmitters in sections of road beyond 605 may be turned-off. However, as the vehicle moves forward for example to section 605, the power transmitters of sections 604 may be turned-off while the power transmitters of section 605, and the like may be turned-on. The number of power transmitters turned-on around the vehicle may depend on many factors like the range of laser coupling, the strength of the lasers, the length of the vehicle, the number of receiver devices on the vehicle, the legal laser safety limits and the like as may be appreciated by one with ordinary skill in the art. Further, if vehicles that do not posses the onboard wireless charging devices or may not need to charge their batteries or the like travel on the roads with wireless power transmitters, the power transmitters would not be turned on there by using their power only when necessary to charge a vehicle with wireless laser power receiver device and optionally only when such a vehicle needs its batteries to be charged.

Even though the illustrations in this patent application illustrate two batteries on board a vehicle, one with ordinary skill in the art will appreciate that a vehicle with one or more batteries based systems may also be devised using the teachings of this patent application and all such variations are within the scope and spirit of this invention. When only a single battery is used, the battery may not optionally be used to drive the load and just be used to charge the battery and when it is being charged a fuel engine or the like may be used to drive the vehicle.

While the foregoing has been with reference to particular embodiments of the invention, it will be appreciated by those skilled in the art that changes in these embodiments may be made without departing from the principles and spirit of the invention.

The invention claimed is:

1. A road way system comprising a wireless charging system for vehicles, said wireless charging system comprising a transmitter system and further comprising a receiver system, said transmitter system to wirelessly transmit power to said receiver system, said transmitter system wirelessly coupled to the said receiver system using magnetic resonant coupling, said transmitter and receiver systems comprising tuned electromagnetic circuits to perform wireless power transfer from said transmitter system to said receiver system, said transmitter system embedded under, or over, or by the side of the said road way system, and the said receiver system installed in said vehicles used on said road way system, said receiver system comprising a rechargeable battery system wirelessly coupled to said transmitter system to charge a rechargeable battery, and said receiver system further comprising electric motor powered by said rechargeable battery to drive said vehicle operated by said rechargeable battery system, when said rechargeable battery is charged.

2. The road way system of claim 1, comprising a plurality of transmitter systems where a first group of said transmitter systems get turned on to transmit the power to said receiver system to charge said rechargeable battery when one of said vehicles is within a pre-selected distance from said group of transmitter systems, and a second group of transmitter systems that are turned off when said vehicle is at least said pre-selected distance away from said second group of transmitter systems.

3. A wireless charging system for vehicles, said wireless charging system comprising a transmitter system and further comprising a receiver system, said transmitter system to wirelessly transmit power to said receiver system, said transmitter system comprising a light or laser or infrared laser transmitting device coupled to said receiver system using visible or invisible light spectrum coupling, said receiver system comprising a visible or invisible light detector panel to receive the energy transmitted by said transmitter, said receiver system further comprising a rechargeable battery system wirelessly coupled to said transmitter system to charge z rechargeable battery, and said receiver system further comprising a load operated by said rechargeable battery system, when said rechargeable battery is charged, said wireless charging system for vehicles for use in a road way system, said road way system comprising said transmitter system embedded under, or over, or by the side of said road way system, and said receiver system installed in said vehicles used on said road way system, said receiver system comprising said rechargeable battery system wirelessly coupled to said transmitter system to charge said rechargeable battery, and said receiver system further comprising electric motor powered by said rechargeable battery to drive said vehicle operated by said rechargeable battery system, when said rechargeable battery is charged.

4. The road way system of claim 3, comprising a plurality of transmitter systems where a first group of said transmitter systems get turned on to transmit the power to the said receiver system to charge said rechargeable battery when one of said vehicles is within a pre-selected distance from said group of transmitter systems, and a second group of transmitter systems that are turned off when said vehicle is said pre-selected distance away from said second group of transmitter systems.

5. The light or laser or infrared laser transmitting device of claim 3, comprising a focusing or directional power transmitting apparatus to focus the transmitted power in a preset direction to maximize said transmit power to said receiver system.

* * * * *